Figure 1:
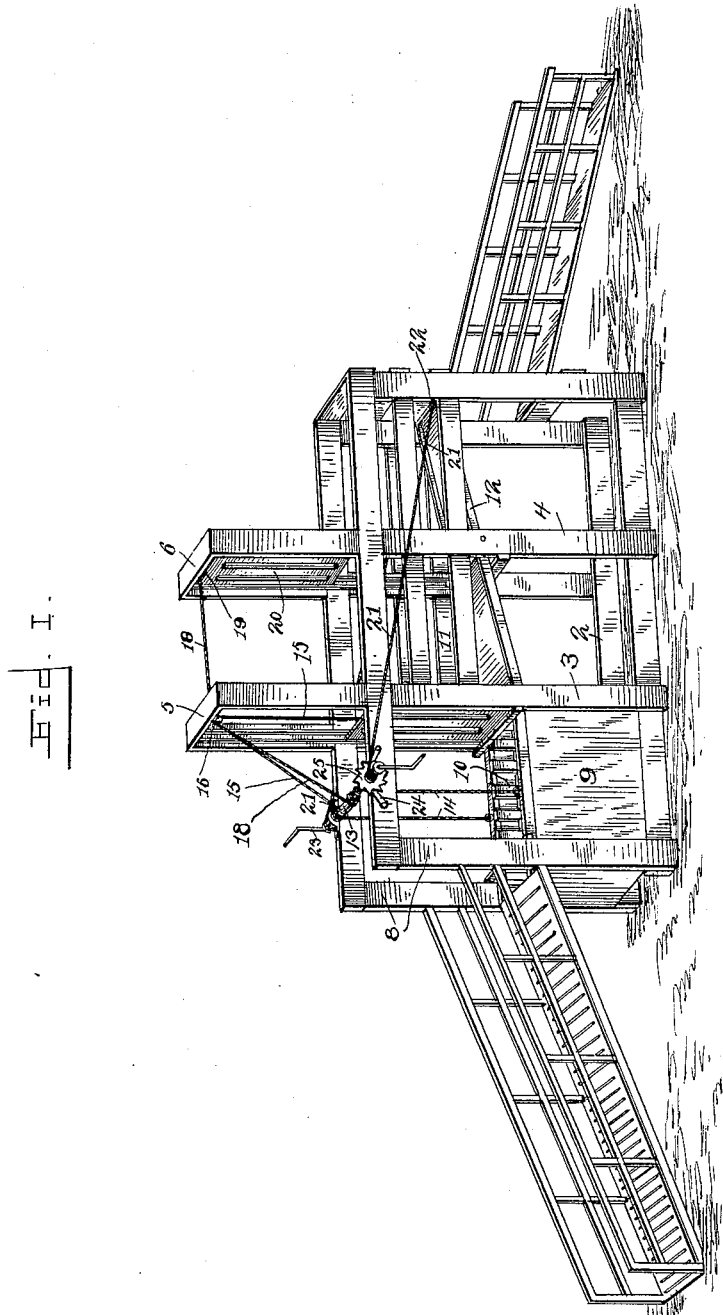

No. 606,946. Patented July 5, 1898.
E. A. STEEN.
ANIMAL DIPPING TANK.
(Application filed Oct. 6, 1897.)
(No Model.) 2 Sheets—Sheet 1.

Witnesses:
Fenton S. Belt,
J. A. Wilson.

Inventor:
E. A. Steen,
by H. R. Wilson & Co.,
Attorneys

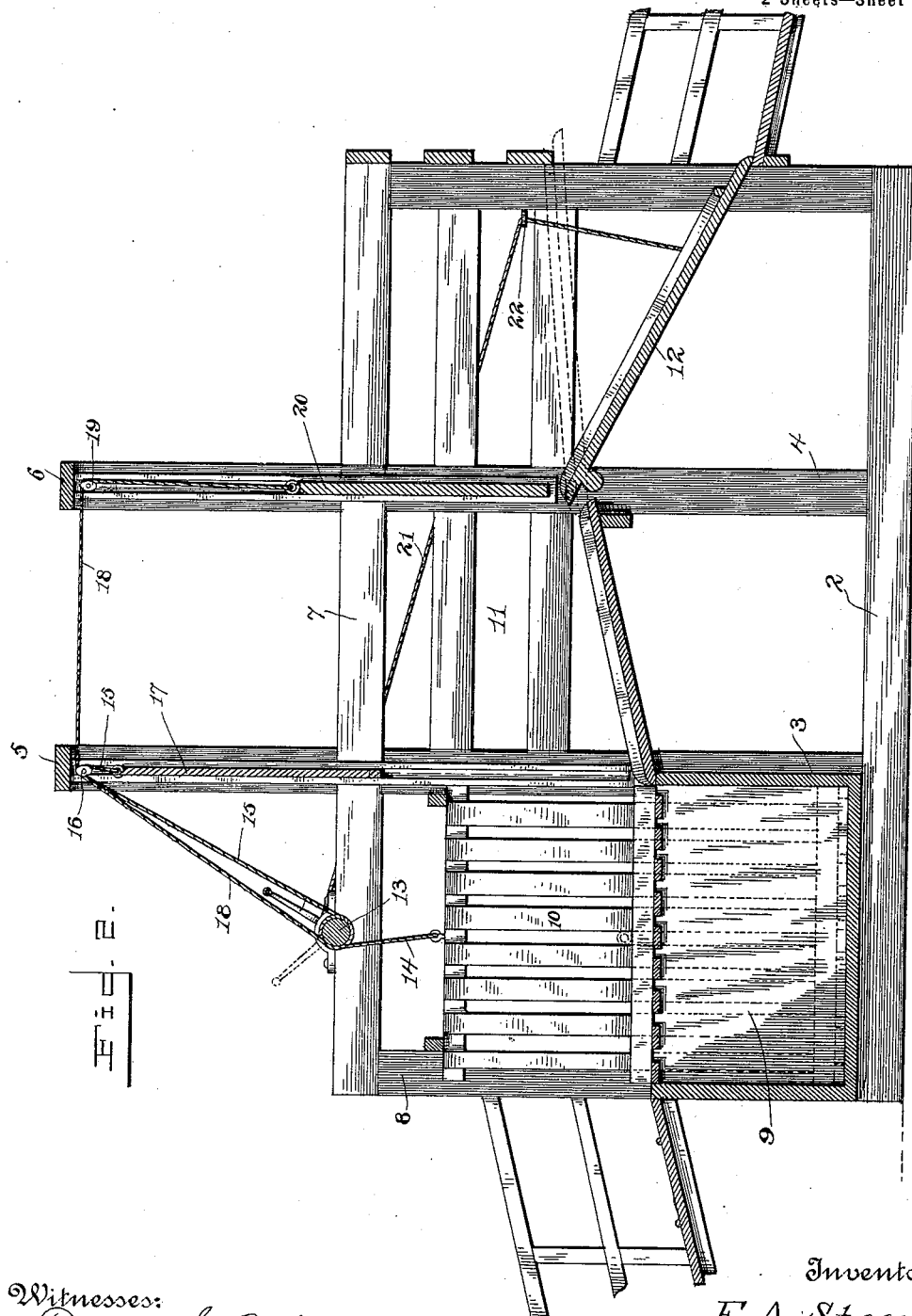

UNITED STATES PATENT OFFICE.

EDWARD A. STEEN, OF FINDLAY, OHIO.

ANIMAL-DIPPING TANK.

SPECIFICATION forming part of Letters Patent No. 606,946, dated July 5, 1898.

Application filed October 6, 1897. Serial No. 654,249. (No model.)

*To all whom it may concern:*

Be it known that I, EDWARD A. STEEN, a citizen of the United States, residing at Findlay, in the county of Hancock and State of Ohio, have invented certain new and useful Improvements in Animal-Dipping Tanks; and I do declare the following to be a full, clear, and exact description of the invention, such as will enable others skilled in the art to which it appertains to make and use the same.

My invention relates to that class of devices known as "animal-dipping tanks," used for bathing purposes, but principally for removing or destroying vermin and insects with which the animals are infested; and the object is to simplify the construction and render automatic the operation of certain parts, as will be hereinafter described.

With this object in view the invention consists in certain features of construction and combination of parts, which will be hereinafter fully described and claimed.

In the accompanying drawings, Figure 1 is a perspective view of my improved animal-dipping device, and Fig. 2 is a longitudinal sectional view showing in full lines the tank elevated and the position of the parts affected by the elevation of the tank and in dotted lines a reversal of the same parts affected by the lowering of the tank.

In said drawings I have shown the preferred embodiment of my invention, wherein 1 denotes the framework, which consists of the sills 2, posts 3 and 4, connected at their upper ends by cross-pieces 5 and 6, longitudinal strips 7, and end posts 8. Between the posts 3 and 8 is arranged the dipping-tank 9, which is adapted to contain either simply the water for purposes of bathing the animal or, if desired, a vermin or insect destroyer in liquid form. A platform leads to the tank, so that the animal may be driven into the cage 10, which is adapted to move up and down in said tank.

11 denotes the draining-pen, and 12 the hinged draining-platform. A windlass 13 is journaled in suitable bearings on the longitudinal pieces 7 and has ropes 14 secured thereto and connected to the cage. A rope 15 extends through a pulley 16, secured to the cross-piece 5, and is connected with a vertically-sliding door 17. A rope 18 is connected to the windlass and extends through a pulley 16 of the cross-piece 5, thence through a pulley 19 of the cross-piece 6 and is connected to a door 20.

21 denotes ropes connected to the windlass and extending on the outside of the frame through pulleys 22 and connected to the free end of the platform 12. The ropes are connected to the pulley in such a manner so that when an animal has been dipped and the windlass turned to elevate the animal the door 17 will be elevated, so as to permit the animal to pass into the dripping-pen 11. Then as another animal is driven into the pen and the pen descends to submerge the animal the door 17 is lowered to prevent the animal backing down into the tank and the door 20 elevated to let the animal pass off on the hinged platform 12, the rear end of which is elevated by the lowering of the cage and is closed by the rear end of the cross-pieces 21', so that it forms a continuation of the inclined bottom of the pen 11 and permits a still further draining of the animal and of the drainage being carried back to the tank. As the cage is elevated the door 20 is lowered, and also the rear end of the platform 12, so that the animal may pass off the rear end of the platform onto the stationary platform, from which it may be led to any suitable or desirable point. It will be noticed that the weight of the animal on the hinged platform serves to assist in raising the animal in the cage, thus making the operation of the machine a great deal easier than were it required to raise the dead-weight. In other words, the platform and cage are counterbalanced in their operation.

Any suitable means may be employed for rotating the windlass; but as shown in the accompanying drawings I have provided a crank 23. I have also provided a ratchet 24 for engaging the ratchet-wheel 25, so that the parts may be held in any desired adjustment.

From the foregoing description, taken in connection with the accompanying drawings, the construction and operation of the invention will be readily understood without requiring an extended explanation.

While I have shown the preferred embodiment of my invention, I would have it distinctly understood that I do not wish to be restricted to the details of construction, as many changes may be made without departing from the spirit of my invention, and I therefore reserve to myself the right to make any changes in the construction that fall within the scope of my claim.

Having thus described my invention, what I claim, and desire to secure by Letters Patent, is—

In a device of the character described, the combination with the dipping-tank, the cage having a vertical movement therein, a draining-pen, doors at the entrance and exit of said pen, a tilting platform entirely inclosed by a framework when in its elevated position, a windlass, and ropes leading from the cage, doors and pivoted platform to the windlass, whereby when the platform is lowered one of the doors or guards will be raised and the other lowered and at the same time, the tilting platform will be actuated.

In testimony whereof I hereunto affix my signature in presence of two witnesses.

EDWARD A. STEEN.

Witnesses:
CHAS. E. STEEN,
M. D. SOURS.